United States Patent [19]

Mochizuki

[11] Patent Number: 5,042,864
[45] Date of Patent: Aug. 27, 1991

[54] ANGULARLY MOVABLE SEAT CONSTRUCTION FOR USE IN VEHICLE WITH SLIDING DOORS

[75] Inventor: Chizuko Mochizuki, Hamamatsu, Japan

[73] Assignee: Suzuki Motor Company Limited, Shizuoka, Japan

[21] Appl. No.: 401,075

[22] Filed: Aug. 31, 1989

[30] Foreign Application Priority Data

Sep. 6, 1988 [JP] Japan .................................. 63-222642

[51] Int. Cl.⁵ ............................................... B60N 2/14
[52] U.S. Cl. .................................... 296/65.1; 296/155; 297/349; 248/393; 248/398; 248/416; 248/425
[58] Field of Search ................... 296/64, 65.1, 155; 297/349; 248/371, 393, 398, 416, 425

[56] References Cited

U.S. PATENT DOCUMENTS

| 3,572,817 | 3/1971 | Colautti et al. ................. 296/65.1 |
| 3,594,036 | 7/1971 | Cadiou ........................... 296/155 |
| 3,860,283 | 1/1975 | Colautti .......................... 296/65.1 |
| 4,155,587 | 5/1979 | Mitchell ......................... 296/65.1 |
| 4,436,270 | 3/1984 | Muraishi ...................... 296/65.1 X |
| 4,544,198 | 10/1985 | Ochiai et al. .................... 296/155 |
| 4,588,226 | 5/1986 | Young et al. ................... 297/344 X |
| 4,725,031 | 2/1988 | Simin ........................... 296/65.1 X |
| 4,792,188 | 12/1988 | Kawashima .................. 296/65.1 X |

FOREIGN PATENT DOCUMENTS

| 601887 | 2/1960 | Italy ................................. 296/155 |
| 505672 | 5/1939 | United Kingdom ............... 296/155 |

Primary Examiner—Margaret A. Focarino
Assistant Examiner—Andrew C. Pike
Attorney, Agent, or Firm—McGlew & Tuttle

[57] ABSTRACT

A seat construction for a vehicle includes a driver's seat angularly movable about a generally vertical axis toward a door opening formed in a side portion of a vehicle body. When a sliding driver door is opened, the driver's seat is angularly moved toward the door opening, so that the driver can easily get in and off the vehicle. An open area of the door opening, available when the sliding driver door is opened, is disposed slightly forwardly, and therefore the angle of angular movement of the driver's seat required for the driver to get in and off the vehicle can be relatively small.

3 Claims, 7 Drawing Sheets

ANGULARLY MOVABLE SEAT CONSTRUCTION FOR USE IN VEHICLE WITH SLIDING DOORS

FIELD OF THE INVENTION AND RELATED ART STATEMENT

This invention relates to a seat construction for use in a vehicle such as an automobile.

An automotive vehicle construction is known which has a sliding door to enable a person to get in and out of the vehicle even at a narrow or limited place. Generally, such vehicles are mostly of the type for carrying goods, and passenger cars having such a sliding door are rarely seen.

Generally, an ordinary passenger car has doors of a generally polygonal shape each having a forwardly-bulged front portion. Even if such a polygonal door is merely converted to a sliding door, the forwardly-bulged front portion interferes with the person getting in and out of the car. Thus, such a door could not be adapted for use as a sliding door for the conventional passenger car.

OBJECT AND SUMMARY OF THE INVENTION

It is therefore an object of this invention to provide a seat construction which enables a person to easily get in and out of a passenger car having a sliding door.

According to the present invention, there is provided a seat construction for a vehicle having a driver door which is slidingly movable to open the door opening formed in one side of the vehicle, the seat construction comprising a driver's seat which is angularly movable toward the door opening.

As driver's seat (or passengers seat) is angularly moved toward the door opening when the sliding driver door (or passenger door) is opened, a sufficient space is obtained to enable the driver (or passenger) to easily get in and out of the vehicle.

DETAILED DESCRIPTION OF PREFERRED EMBODIMENTS

The invention will now be described with reference to the drawings.

Figure 1:
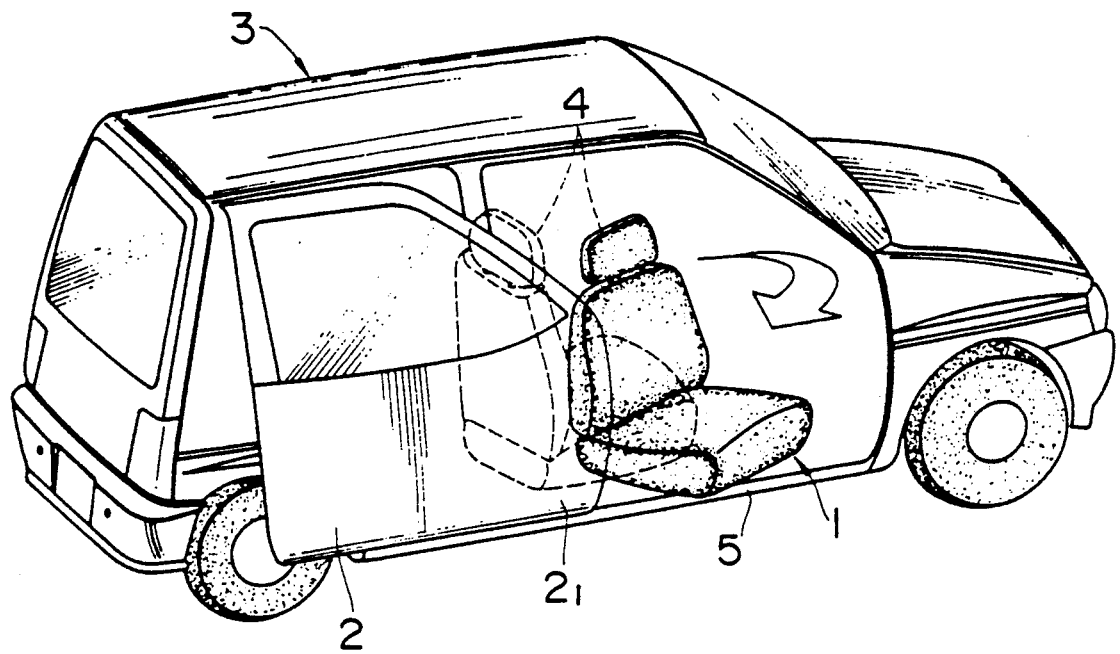
FIG. 1 is a perspective view of an automotive vehicle or car incorporating a seat construction according to the present invention, as viewed from one side of the vehicle.
Figure 2:
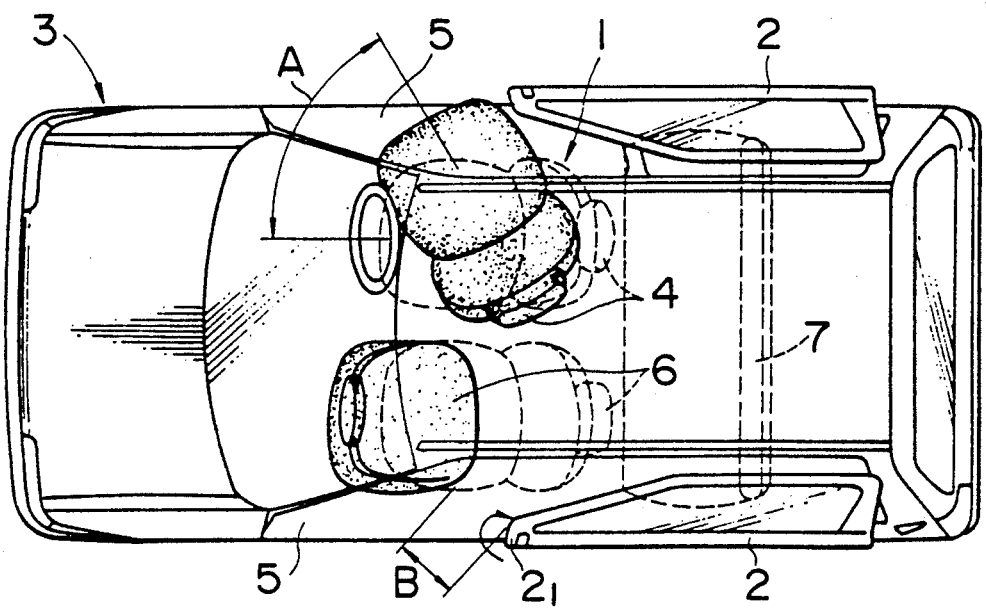
FIG. 2 is a top plan view of the vehicle.
Figure 3:
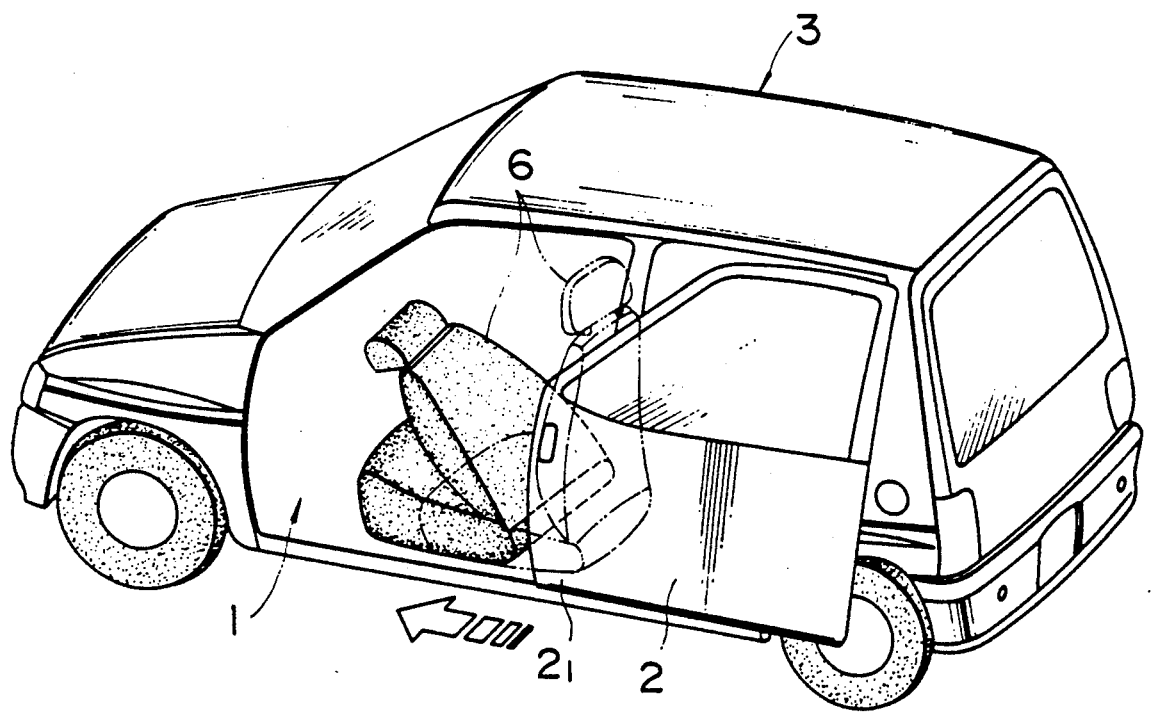
FIG. 3 is a perspective view of the vehicle as viewed from the other side thereof.

FIGS. 1 to 3 shows one preferred embodiment of a seat construction of the present invention for use in an automotive vehicle.

In the seat construction 1 according to the present invention, a driver's seat 4 of a vehicle 3 having right and left sliding doors 2 and 2 can be angularly moved when the sliding door 2 (hereinafter referred to as "driver door") at the driver side is opened. A mechanism for angularly moving the driver's seat 4 comprises, for example, means responsive to the sliding movement of the sliding door 2 so as to release the locking of the driver's seat against angular movement, or a manually-operative lever for releasing such locking. One example of such mechanism for angularly moving the driver's seat will be described below.

In order that the driver can easily get in and out of the vehicle 3, the driver's seat 4 has only to be angularly moved to about the middle of the portion of opening 5 which is unobstructed when the sliding door 2 is opened. Thus, the angle A of angular movement of the driver's seat 4 necessary for the driver to get in and out of the vehicle 3 can be relatively small.

A front passenger's seat 6 of the vehicle 3 is so arranged as to be slidable toward and away from the front of the vehicle body.

A mechanism for effecting such sliding movement of the passenger's seat 6 is well known in the art and therefore will not be described here.

In the seat construction 1, when the driver is to get in or out of the vehicle 3, the driver's seat 4 is angularly moved toward the door opening 5, so that the driver can easily get in or out of the vehicle. Since the angle A of angular movement of the driver's seat 4 necessary for the driver to get in or out of the vehicle 3 is relatively small as described above, even a driver without great strength can easily direct the driver's seat toward the door opening 5 while the driver remains seated on the driver's seat.

When the passenger is to get into and out of a rear passenger's seat 7, the front passenger's seat 6 is slidingly moved forward to thereby secure a sufficient space B for enabling such movement of the passenger even though the sliding door 2 has a forwardly-bulged front portion 2₁.

Thus, the vehicle 3 is so designed that a person can easily get into and out of any of the driver's seat 4, the front passenger's seat 6 and the rear passenger's seat 7.

The angle A of angular movement of the driver's seat 4 is relatively small as described above, and therefore the seat construction 1 can incorporate a mechanism for sliding the driver's seat 4 forward, in addition to the mechanism for angularly moving the driver's seat 4. With such an arrangement, the driver can more smoothly get in and out of the vehicle 3.

As described above, in the seat construction 1 of the present invention, the driver's seat 4 is so designed as to be angularly movable toward the door opening 5, and because of this arrangement, the open area of the door opening 5 obtainable when opening the sliding door 2 is disposed slightly forwardly. Therefore, the angle A of angular movement of the driver's seat 4 can be relatively small, and the driver can smoothly get in and out of the vehicle 3. Even a driver without great strength can easily get in and out of the vehicle.

In the present invention, the driver door 2 is of the slidable type, and therefore the sliding door 2 in its open condition will not be projecting outwardly from the vehicle body.

Further, the front passenger's seat 6 is slidable toward and away from the front of the vehicle body, and therefore the passenger can easily get into and out of the rear passenger's seat 7 by sliding the front passenger's seat 6 forward to obtain sufficient space.

Figure 4:
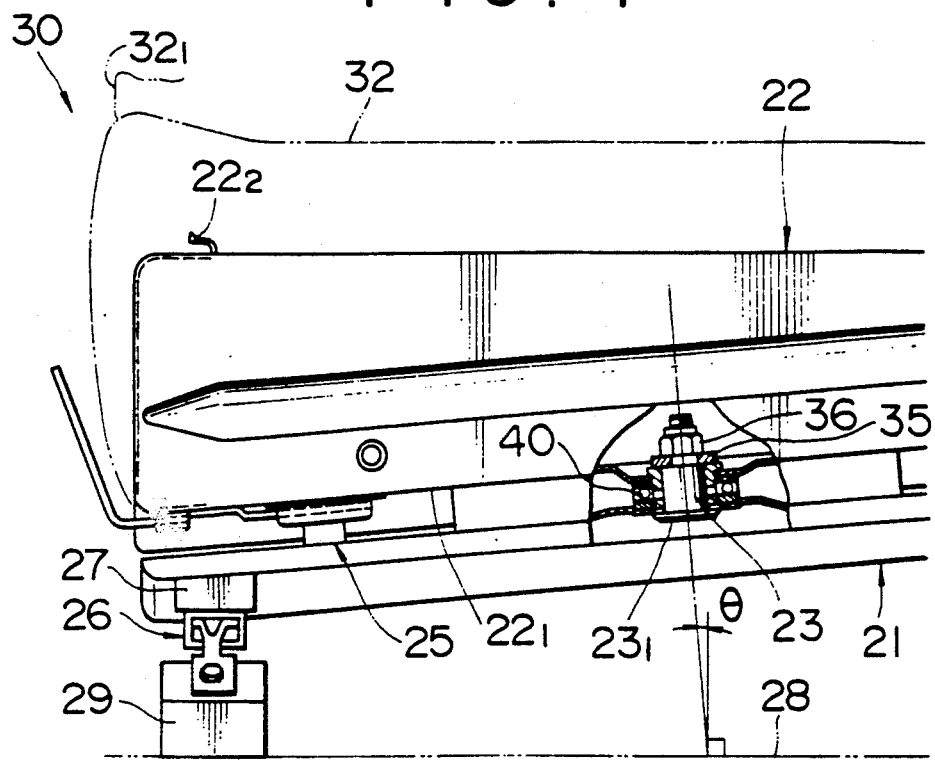
FIG. 4 is a front-elevational view of a portion of a seat body provided with a seat angular movement device.
Figure 5:
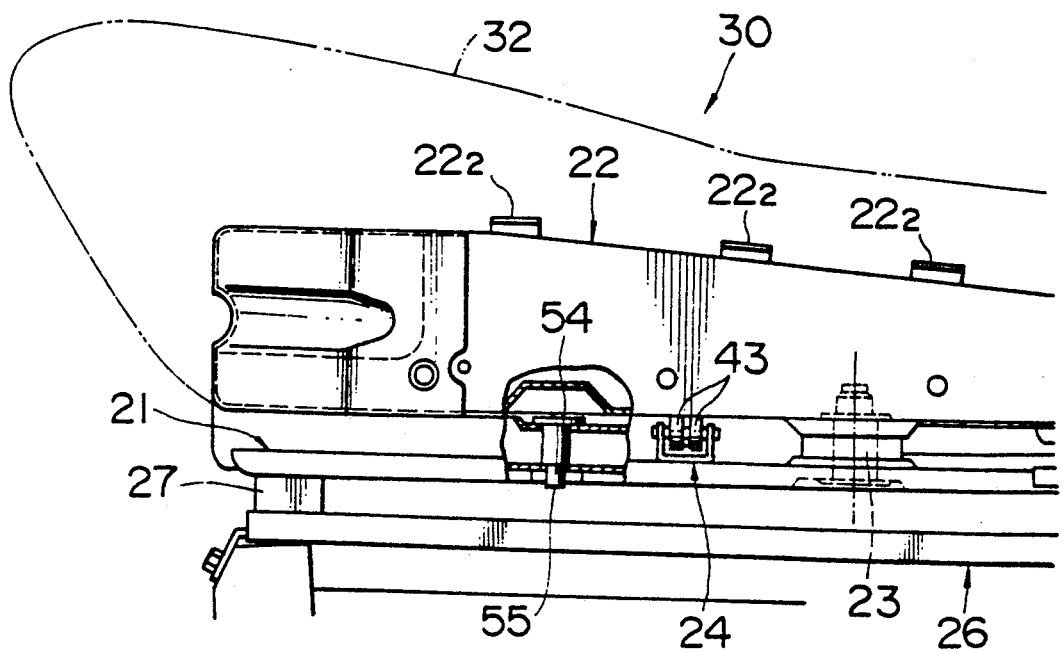
FIG. 5 is a left side-elevational view of a portion of the seat body.
Figure 6:
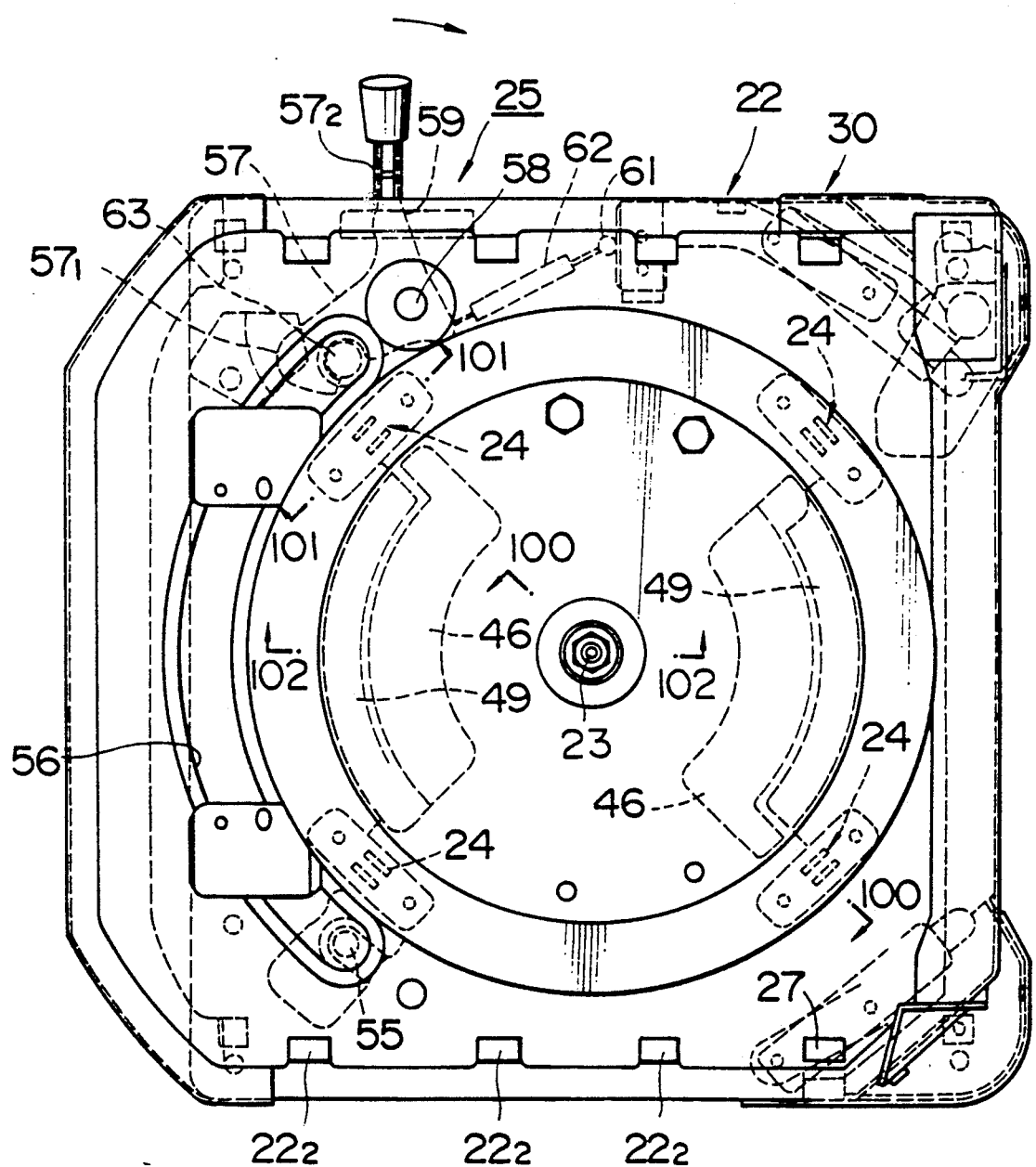
FIG. 6 is a plan view of the seat angular movement device.

The mechanism or device for angularly moving the driver's seat 4 will now be described with reference to FIGS. 4 to 10. As shown in FIGS. 4 to 6, this seat angular movement device comprises a fixed support member 21, an angularly movable support member 22, a pivot member 23 mounted between the two support members 21 and 22, and roller assemblies 24 mounted between the two support members 21 and 22. The seat angular movement device further comprises a lock device 25 (FIG. 6) for locking the angularly movable support member 22 against angular movement.

A pair of slide rail assemblies 26 (left and right) and are provided below the fixed support member 21 adjacent to the opposite lateral sides of the fixed support member 21. These slide rail assemblies 26 extend along the longitudinal axis of the vehicle body (i.e., in forward and backward directions). More specifically, each slide rail assembly 26 is fixedly mounted on the underside of the fixed support member 21 through a pair of blocks 27 connected respectively to the front and rear ends thereof. A pair of mounting bases 29 are fixedly mounted on a floor 28 and disposed below the front and rear right corner portions of the fixed support member 21, respectively. Similarly a pair of mounting bases 31 are fixedly mounted on the floor 28 and disposed below the front and rear left corner portions of the fixed support member 21, respectively. The mounting base 31 is greater in height than the mounting base 29.

The right and left slide rail assemblies 26 are fixedly secured at their front and rear ends to the pair of mounting bases 29 and the pair of mounting bases 31, respectively. Therefore, as shown in FIG. 4, the fixed support member 21 is inclined downwardly toward its right side (that is, in a left-hand direction in the drawings). The left-hand side of the structure of FIG. 4 of the fixed support member 21 faces the driver door. As shown in FIG. 5, the pair of slide rail assemblies 26 are slightly slanting downwardly rearwardly as in an ordinary slide rail.

A seat cushion 32 is mounted on the angularly movable support member 22, and a seat back $32_1$ is also mounted on the support member 22 immediately adjacent to the seat cushion 32. The angularly movable support member 22 is in the form of a box having an open top, and has a plurality of claws $22_2$ formed on an upper end of each of right and left side walls of the support member 22. A plurality of cushion springs (not shown) supporting the seat cushion 32 are engaged respectively with the mating claws $22_2$ on the right and left side walls of the support member 22. A lower surface $22_1$ of the angularly movable support member 22 slants downwardly toward the driver door (see FIG. 4), so that this lower surface 22a is disposed parallel to the fixed support member 21. A seat body 30 comprises the angularly movable support member 22, the seat cushion 32, etc.

Figure 7:
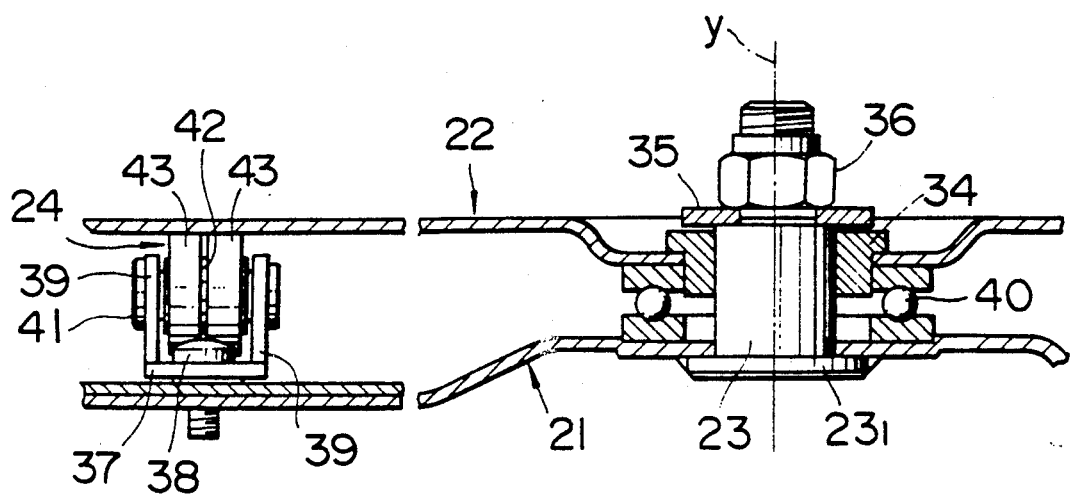
FIG. 7 is a cross-sectional view taken along the line 100—100 of FIG. 6.

As shown in FIGS. 4 and 7, a pivot pin 23 is welded at its lower flange portion $23_1$ to the central portion of the fixed support member 21, and extends perpendicularly from the fixed support member 21. The pivot pin 23 passes through a bushing 34 mounted on the central portion of the angularly movable support member 22. The pivot pin 23 has an upper threaded portion on which a nut 36 is threaded through a washer 35, so that the angularly movable support member 22 is connected to the fixed support member 21 so as to be angularly movable about the pivot pin 23 relative to the fixed support member 21. A thrust bearing 40 is interposed between the fixed support member 21 and the angularly movable support member 22, and is fitted on the bushing 34.

Since the pivot pin 23 is disposed perpendicular to the fixed support member 21, the axis of the pivot pin 33 is inclined at an angle $\theta$ relative to the vertical axis, as shown in FIG. 4. In this embodiment, this inclination angle $\theta$ is about 9 degrees, but is not restricted to such value.

Figure 8:
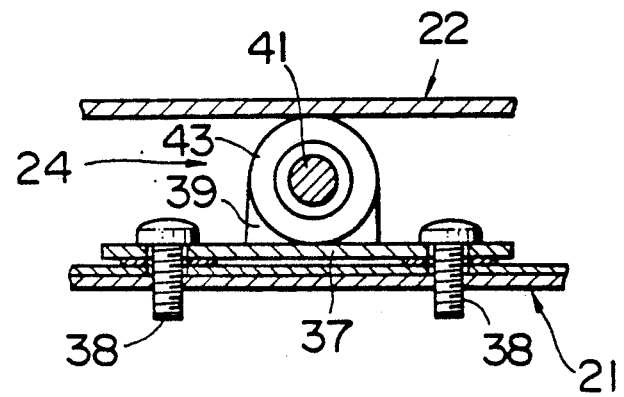
FIG. 8 is a cross-sectional view taken along the line 101—101 of FIG. 6.

As shown in FIGS. 7 and 8, a plurality of brackets 37 are disposed at the favorable place between the angularly movable support member 22 and the fixed support member 21 and are fixedly secured to the fixed support member 21 by screws 38, the brackets 37 being spaced from one another in the circumferential direction of the fixed support member 21. A pin 41 is mounted on a pair of opposed arms 39 of each bracket 37, and is directed toward the pivot pin 23. A pair of rollers 43 are rotatably mounted on the opposed arms 39 through the pin 41, and are spaced from each other and also from the opposed arms 39 by spacers 42. The rollers 43 mounted on the plurality of brackets 37 are held in rolling engagement at their upper ends with the lower surface of the angularly movable support member 22 to support the angularly movable support member 22. Each of the abovementioned roller assemblies 24 comprises the bracket 37, the pair of rollers 43, etc. As shown in FIG. 6, the plurality of roller assemblies 24 are disposed on a circle having a center at the pivot pin 23.

Figure 9:
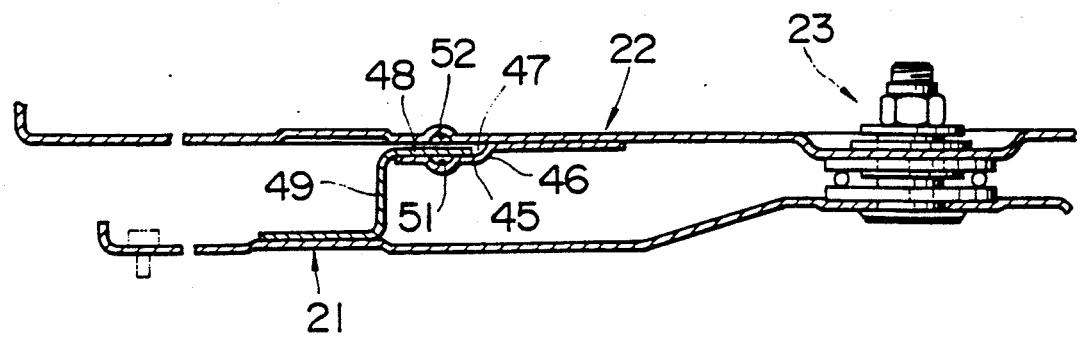
FIG. 9 is a cross-sectional view taken along the line 102—102 of FIG. 6.

As shown in FIG. 9, a pair of holder members 46 are fixedly mounted at their one sides to the underside of the angularly movable support member 22 in diametrically opposite relation, each holder member 46 having a flange 45 at the other side. A space 47 is formed between the flange 45 and the angularly movable support member 22. A pair of support members 49 are fixedly secured at their one sides to the upper surface of the fixed support member 21, each support member 49 having a flange 48 at the other side. Each flange 48 is inserted into a respective one of the spaces 47. The flange 45 of each holder member 46 has a recess 51, and the angularly movable support member 22 also has a recess 52. The recess 51 is disposed in opposed relation to the recess 52. Grease is filled in the spaces defined by the recesses 51 and 52 and the flange 48.

As shown in FIGS. 5 and 6, a stop pin 55, which has at its upper end a flange 54, is fixedly mounted on the lower wall of the angularly movable support member 22. The stop pin 55 is received in an arcuate slot 56 so as to be movable along the slot 56. The slot 56 is formed in the fixed support member 21. The abutment of the stop pin 55 against the opposite ends of the slot 56 limits the angular movement range of the angularly movable support member 22 in the opposite directions.

As shown in FIG. 6, a lock member 57 is pivotally mounted by a pin 58 on the angularly movable support member 22. The lock member 57 has a hook 57₁ at one end and also has a lever 57₂ at the other end. The lever 57₂ extends outward from the angularly movable support member 22 through a slot 59. The slot 59 is formed in the side wall of the angularly movable support member 22. The angular movement of the lever 57₂ in opposite directions is limited by the ends of the slot 59. The lock member 57 is urged in a counterclockwise direction (FIG. 6) by a tension spring 62. The spring 62 extends between the lock member 57 and a pin 61 mounted on the angularly movable support member 22. By the dint of the spring 62, the hook 57₁ of the lock member 57 is normally engaged with a pin 63 fixedly mounted on the fixed support member 21. Therefore, the hook 57₁ prevents the angular movement of the angularly movable support member 22. The abovementioned lock device 25 comprises the lock member 57, the tension spring 62, the pin 63, etc.

When the seat body 30 is to be angularly moved toward the door opening 5 so that the driver can get into and out of the driver's seat 4, the lever 57₂ is angularly moved about the pin 58 in a direction of an arrow (FIG. 6) so as to disengage the hook 57₁ from the pin 63. Then, the locking of the lock member 57 relative to the angularly movable support member 22 is released. Accordingly, the seat body 30 can be manually moved angularly toward the door opening 5.

Figure 10:
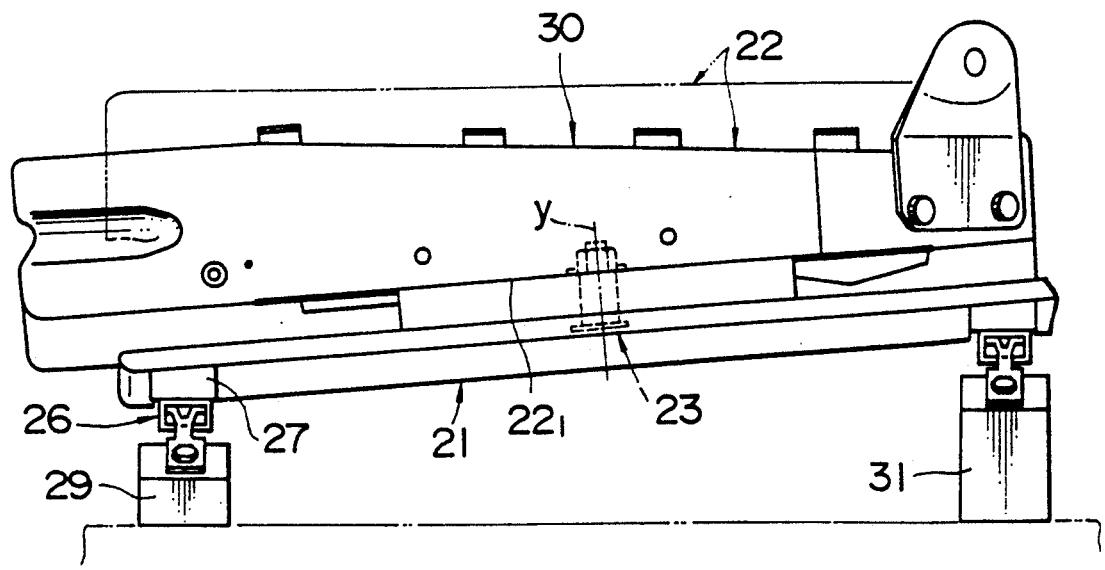
FIG. 10 is a front-elevational view of the seat body angularly moved from a normal driving position to a getting-in-and-off position.

FIG. 10 shows the condition in which the seat body 30 has been angularly moved through 90 degrees from its normal driving position (indicated in a dot-and-dash line) toward the door opening 5. At this time, the seat body 30 is angularly moved about the axis of the inclined pivot member 23, so that the front portion of the seat body 30 is moved to the lower-level portion of the fixed support member 21. Therefore, the front portion of the seat body 10 descends to the lower getting-in-and-off position (indicated in solid lines in FIG. 10) from the higher driving position (indicated in the dash-and-dots line). Also, at this time, the rear portion of the angularly movable support member 22 is moved to the higher portion of the fixed support member 21.

As a result of the angular movement of the angularly movable support member 22 in an inclined plane, the upper surface of the angularly movable support member 22, which is slanting downwardly rearwardly as shown in FIG. 5 when the driver's seat 4 is in its driving position, is disposed generally horizontally as shown in FIG. 10. On the other hand, when the driver's seat 4 is angularly moved from the getting-in-and-off position to the driving position, the front portion 30 of the seat body 30 is again raised as shown in FIG. 5.

The seat body 30 comprises the angularly movable support member 22, the seat cushion 32, etc., as described above. Therefore, the front portion of the seat cushion 32 also descends when the angularly movable support member 22 is angularly moved in the inclined plane to the getting-in-and-off position, so that the driver can easily get in and off the vehicle.

The amount of descending of the front portion of the seat body 30 can be suitably preselected by determining the inclination of the fixed support member 21 (i.e., the angle $\theta$ of inclination of the pivot pin 23). In this embodiment, although the inclination angle $\theta$ is about 9 degrees as mentioned above, this angle is not limited to such value. Also, in this embodiment, although it has been described that the seat body 30 is angularly moved through 90 degrees to the getting-in-and-off position, this is merely for description purposes, and actually the angle of such angular movement is about 60 degrees since the driver door 2 is of the sliding type.

Although the pivot means comprises the pivot pin 23, the pivot means may comprise a ball bearing or the like. In this case, the axis of the ball bearing is disposed perpendicular to the fixed support member 21 as described above for the pivot pin 23. Further, the pivot pin 23 may be replaced by a suitable means which is interposed between the fixed and angularly movable support members 21 and 22 so as to enable the angularly movable support member 22 to angularly move relative to the fixed support member 22 about an inclined axis disposed perpendicular to the fixed support member 21.

With the seat angular movement device mentioned above, when the seat body 30 is angularly moved from the normal driving position to the getting-in-and-off position, the front portion of the seat body 30 descends, so that the driver can easily get in and off the vehicle.

Figure 11:
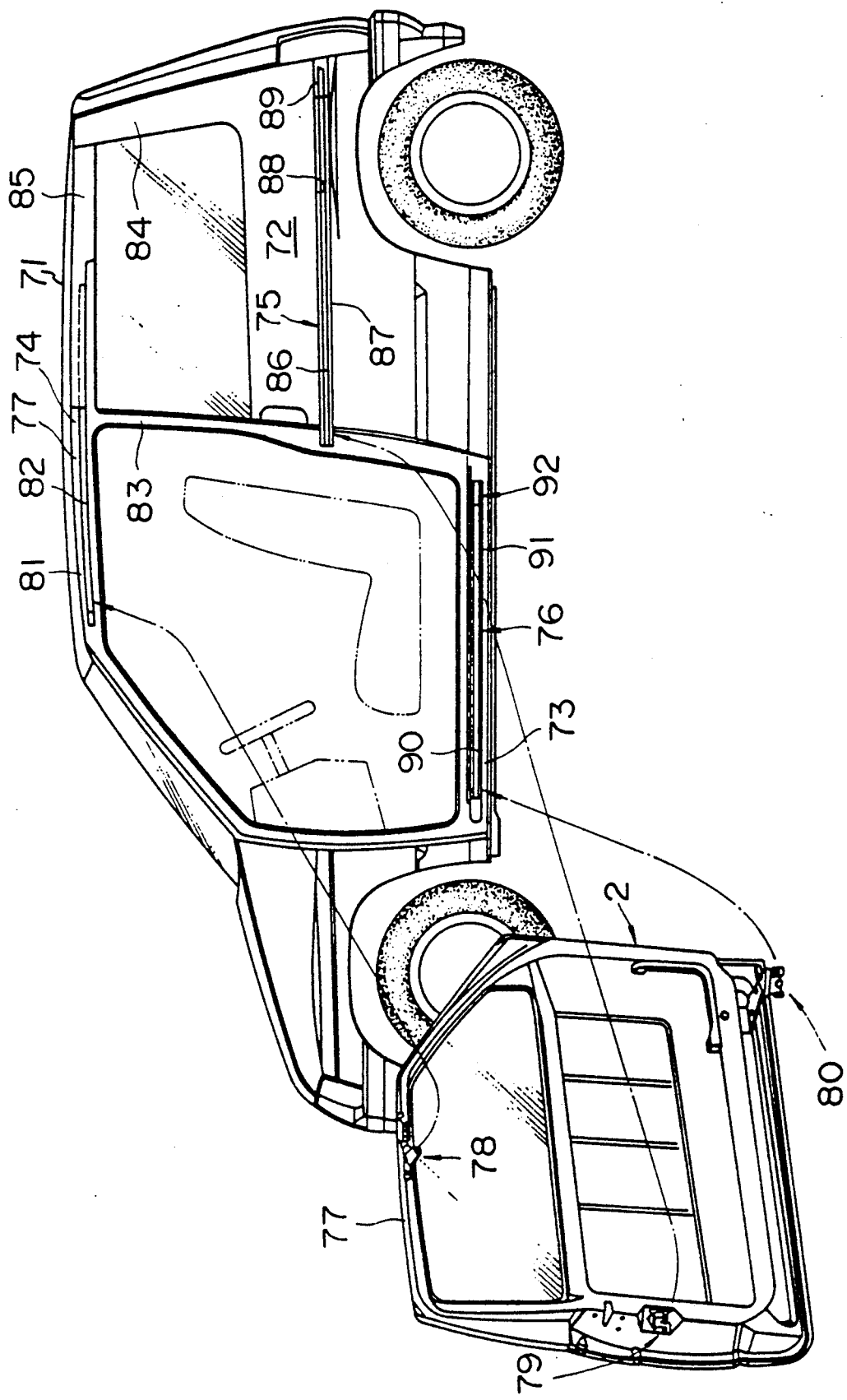
FIG. 11 is a side-elevational view of the vehicle, with a sliding passenger door dismounted, showing a support of the passenger door.

FIG. 11 shows a support mechanism construction for the sliding door 2. The body of the vehicle 3 includes a pair of side body portions each constituted by a roof panel 71, a rear quarter panel 72, a side sill 73, etc. An upper guide means 74, an intermediate guide means 75 and a lower guide means 76 are mounted respectively on the roof panel 71, the rear quarter panel 72 and the side sill 73. Three roller assemblies 78, 79 and 80 are mounted respectively on upper, intermediate and lower portions of an inner panel of the sliding door 2.

The upper guide means 74 comprises a rail (upper rail) 82 in the form of a cross-sectionally square tube having a slit 81 formed through a lower wall thereof. The upper rail 82 extends rearwardly from the front end of the roof panel 71 to a point disposed intermediate a center pillar 83 and a rear pillar 84. A trim element (quarter trim element) 85 is mounted on the roof panel 71 and extends from the center pillar 83 to the rear pillar 84. Part of the upper rail 82 is covered by the trim element 85.

The intermediate guide means 75 comprises a rail (center rail) 87 in the form of a cross-sectionally square tube having a slit 86 formed through a side wall thereof. The center rail 87 is mounted in a center rail-receiving groove 88 formed in the rear quarter panel 72 throughout the entire length thereof. A trim panel (center trim panel) 89 is provided at a rear portion of the center rail-receiving groove 88, and that portion of the center rail-receiving groove 88 in which the center rail 87 is not received is covered by the garnish 89.

The lower guide means 76 comprises a rail (lower rail) 91 in the form of a cross-sectionally square tube having a slit 90 formed through a side wall thereof. The lower rail 91 extends over the entire length of the side sill 73, and a stop means 92 is mounted at the rear end of the lower rail 91.

The sliding door 2 is mounted on the side body portion by engaging the roller assemblies 78, 79 and 80 with the rails 82, 87 and 91, respectively. With this arrangement, the sliding door 2 is slidingly movable along the rails 82, 87 and 91 between its open and closed positions.

I claim:

1. A vehicle comprising: a vehicle body defining a door opening; a sliding door mounted, for sliding into and out of a closed position, in said door opening; a seat positioned within said vehicle adjacent said door opening, said seat being mounted angularly movable from a forward position to a direction toward said door opening; and angular movement means connected to said seat for moving said seat angularly, said angular movement means including a fixed support member fixedly connected to a floor of the vehicle, said support member inclining downwardly toward said door opening, said angular movement means further including an angularly movable support member mounted on said fixed support member about an inclined movement relative to said fixed support member about an inclined axis, said seat being support by said angularly movable support member.

2. A vehicle according to claim 1, wherein said fixed member is slidably supported by right and left slide rail assemblies, said right and left slide assemblies each being fixed to the floor of said vehicle.

3. A vehicle according to claim 1, wherein said angularly movable support member is connected to said fixed support member by a pivot pin for angular movement about said pivot pin, said pivot pin defining said inclined axis, roller assemblies are mounted between said angularly movable support member and said fixed support member, and said angularly movable support member includes a locking device for locking said angularly movable support member against angular movement relative to said fixed support member.

* * * * *